United States Patent [19]

Kakidaira

[11] Patent Number: 4,893,220
[45] Date of Patent: Jan. 9, 1990

[54] HIGH-MOUNTED STOPLIGHT FOR MOTOR VEHICLE

[75] Inventor: Susumu Kakidaira, Shizuoka, Japan

[73] Assignee: Koito Manufacturing Co., Ltd., Tokyo, Japan

[21] Appl. No.: 288,171

[22] Filed: Dec. 22, 1988

[30] Foreign Application Priority Data

Dec. 28, 1987 [JP] Japan .................. 62-330005

[51] Int. Cl.$^4$ ............................................. B60Q 1/44
[52] U.S. Cl. .................... 362/80.1; 362/359; 340/479
[58] Field of Search ................ 362/61, 80, 80.1, 351, 362/359, 802; 340/457.3, 479, 485, 482

[56] References Cited

U.S. PATENT DOCUMENTS

| 4,463,411 | 7/1984 | Proctor | 362/80.1 |
|---|---|---|---|
| 4,626,967 | 12/1986 | Segoshi | 362/61 |
| 4,652,979 | 3/1987 | Arima | 362/80 |
| 4,654,757 | 3/1987 | Birkhauser | 362/80.1 |
| 4,700,277 | 10/1987 | Moore | 340/479 |
| 4,703,398 | 10/1987 | Huth et al. | 362/80.1 |
| 4,722,023 | 1/1988 | Arima et al. | 362/80 |
| 4,724,515 | 2/1988 | Matsuki et al. | 362/96 |
| 4,734,675 | 3/1988 | Wen | 340/479 |

Primary Examiner—Ira S. Lazarus
Assistant Examiner—Richard R. Cole
Attorney, Agent, or Firm—Sughrue, Mion, Zinn, Macpeak & Seas

[57] ABSTRACT

A shade 17 surrounding the lens 20 of a centered "high mount" vehicle stoplight has an extension 17a at its upper end which blocks light diffused/dispersed by the lens and reflected inwardly by the rear window 1 to prevent such light from reaching the driver's eyes via the rearview mirror. The extension is sufficiently long to block light running substantially parallel to the lens and striking the window at a maximum angle $\Theta$, whereby it will inherently also block the remaining light striking the window at a smaller angle.

2 Claims, 6 Drawing Sheets

HIGH-MOUNTED STOPLIGHT FOR MOTOR VEHICLE

BACKGROUND OF THE INVENTION

This invention relates to a high-mounted stoplight disposed at the rear center of a motor vehicle inside the rear window.

A conventional high-mounted stoplight of such kind is disposed over the baggage shelf at the center rear of a motor vehicle inside the rear window 1 thereof, as shown in FIG. 13. The body 2 of the stoplight comprises a main section 4 housing a bulb 3, and a cover 5 protecting the main section. A front lens 6 is attached to the body 2 of the stoplight and covers the front opening of the body. The lens 6 faces the rear window 1 of the motor vehicle. When the driver of the vehicle has depressed the brake pedal, the stoplight is turned on to call the attention of the driver of the following vehicle. However, since there is a gap between the front lens 6 of the stoplight and the rear window 1, some of the light emitted from the stoplight is reflected by the rear window and proceeds toward the front of the vehicle. This light is likely to be reflected by the rearview mirror 7 of the vehicle and into the eyes of the driver.

To solve this problem, a protector 8 made of rubber has been interposed between the front lens 6 of the stoplight and the rear window 1 surrounding the lens, as shown in FIG. 14. As a result, light reflected by the rear window 1 is blocked by the protector 8 so as not to proceed forward to the rearview mirror 7 of the vehicle.

However, the conventional high-mounted stoplight shown in FIG. 14 has inherent problems. Since the protector 8 is provided on the stoplight, the number of components is increased to make the stoplight more expensive. It is difficult to completely block reflected light using the protector 8, because the protector is apt to become deformed or displaced due to the vibration of the motor vehicle, etc. to create a gap between the protector and the rear window 1 to leak light. Since the protector 8 is not colored but is black so as not to reduce the durability of the rubber, the appearance of the protector does not harmonize with the trim of the interior of the vehicle and the color of the stoplight cover 5.

SUMMARY OF THE INVENTION

The present invention solves the above-mentioned problems by preventing light emitted from the light source of a stoplight and reflected by the rear window of a motor vehicle from proceeding to the rearview mirror of the vehicle, being reflected by the mirror and entering the eyes of the driver to hinder his vision, without using a protector surrounding the front lens of the stoplight.

The position of the eyes of the driver of a motor vehicle and the mounting position of the rearview mirror of the vehicle are prescribed by SAE J941 and SAE J834. The inclination of the rear window of the vehicle is also prescribed depending on the type of vehicle. The position of the stoplight relative to the rear window is substantially prescribed. Under these prescriptions, the stoplight according to the invention should be constructed and mounted so that light emitted from the stoplight and reflected by the rear window does not reach the eyes of the driver. However, it is not easy to preset the form of the front lens of the stoplight, that of the body of the stoplight, the distance between the rear window and the front lens and so forth to prevent the light from reaching the eyes of the driver.

The present inventor has looked at the light L emitted from the light source of a stoplight 10 and transmitted upward from the front lens 20 of the stoplight to reach the rear window 1 of a motor vehicle at the largest angle $\Theta$ of incidence thereto, as shown in FIG. 1. The light L proceeds from the foremost point $P_1$ of the front lens 20 and by $P_2$ at the upper portion of the shade of the stoplight in the vertical central longitudinal section of the stoplight. If the light L reflected by the rear window 1 of the vehicle as shown by $L_1$ in FIG. 1 is blocked by the upper portion of the shade of the stoplight and the angle of incidence of all other light from the light source of the stoplight to the rear window is smaller than $\Theta$, all of the light emitted from the light source and reflected by the rear window will be blocked from proceeding to the rearview mirror. The present invention takes advantage of this fact.

The above-mentioned object can thus be attained by providing a high-mounted stoplight for a motor vehicle wherein a front lens is attached to the open front of the body of the stoplight, in which a light source is provided. The front lens and the open front of the body of the stoplight are located at the center rear of the vehicle inside the rear window and away from the window. The stoplight is characterized in that light emitted from the light source, transmitted from the foremost point of the front lens and along the upper portion of the shade of the stoplight in the vertical central longitudinal section of the stoplight and reflected by the rear window of the vehicle toward the front of the vehicle, is blocked by the top of the upper portion of the shade of the stoplight. All light emitted from the light source and reflected by the rear window of the vehicle toward the front of the vehicle is thus prevented from entering the eyes of the driver to hinder his vision.

BRIEF DESCRIPTION OF THE DRAWINGS

FIG. 5 is a sectional view of the stoplight along line V—V in FIG. 2.

DETAILED DESCRIPTION OF THE PREFERRED EMBODIMENTS

Figure 1:
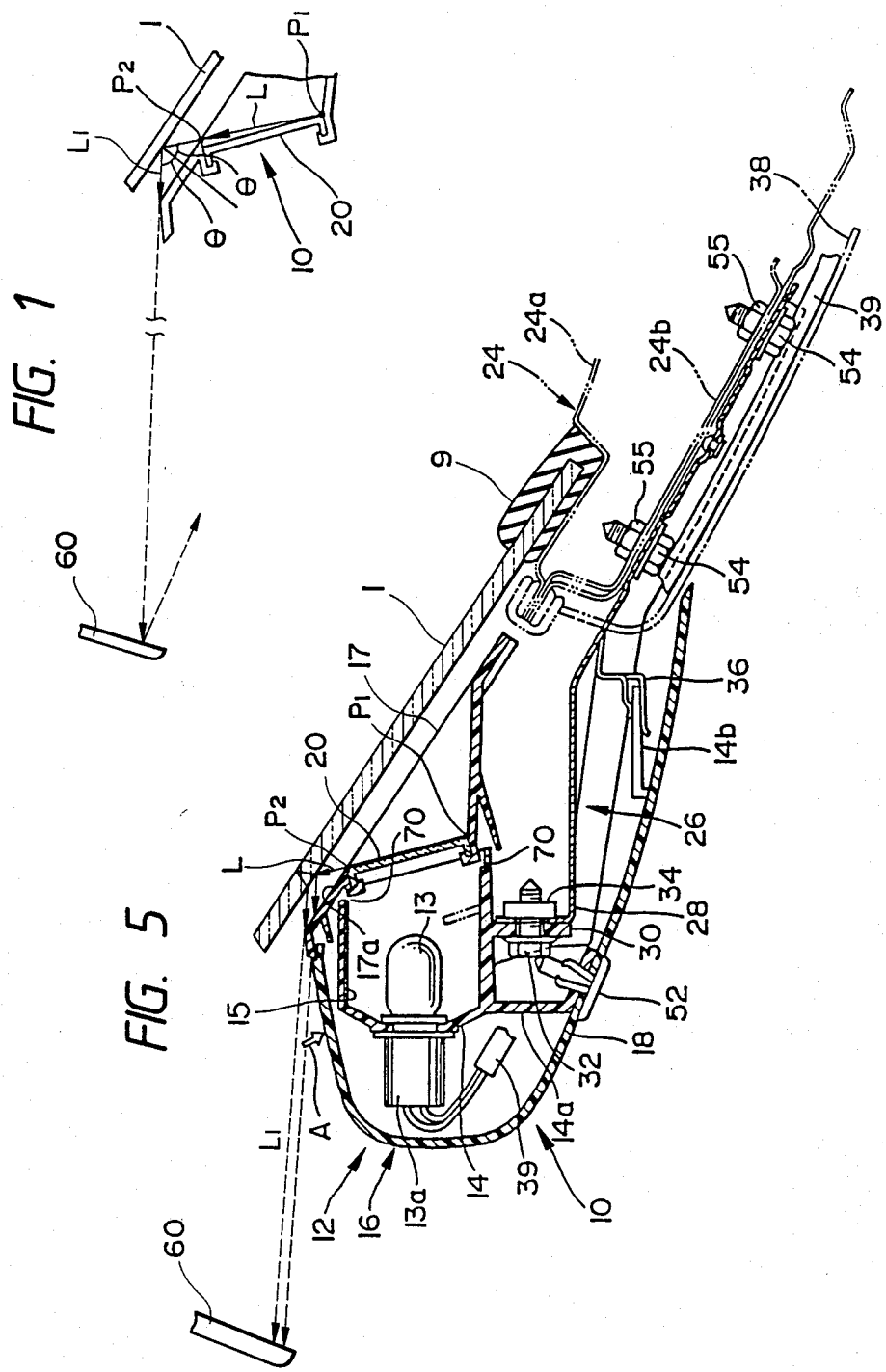
FIG. 1 is a schematic diagram for explaining the principle of the invention.

With reference to the drawings, FIGS. 2 through 9 show a high-mounted stoplight 10 according to one embodiment. The stoplight 10 is secured to the rear structure 24 of the vehicle and located at the center rear of the vehicle inside the rear window 1 thereof. The stoplight comprises a body 12 made of a synthetic resin, and a front lens 20 integrally coupled with the body. The stoplight 10 is located near the rear window 1 secured to the outer plate 24a of the body of the vehicle via a rubber strip 9, as shown in FIG. 5.

Figure 6:
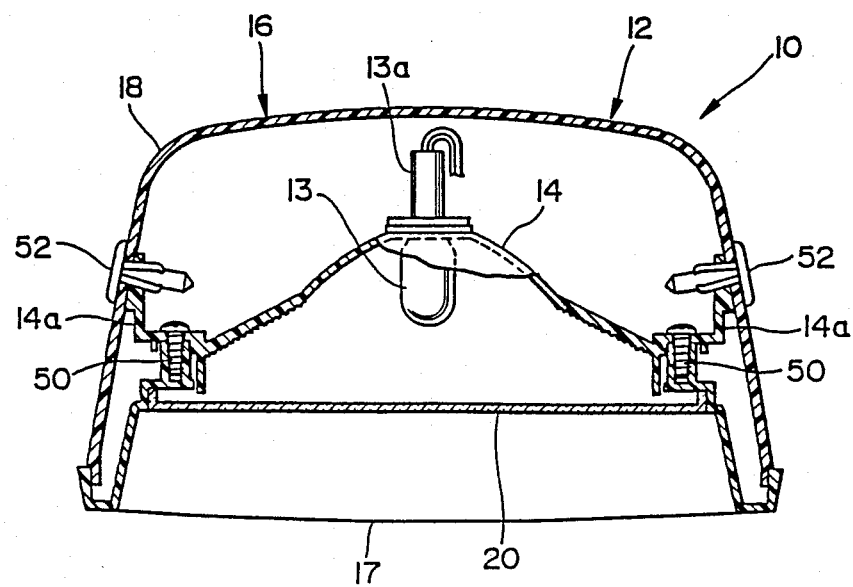
FIG. 6 is a sectional view of the stoplight along line VI—VI in FIG. 2.
Figure 7:
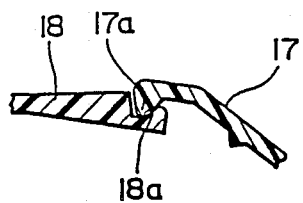
FIG. 7 is an enlarged partial sectional view of a body cover and a shade which are members of the stoplight.

The body 12 of the stoplight 10 comprises a main section 14 housing a bulb 13 and shaped as an enclosure open at the rectangular front thereof, and a body cover 16 covering the body except the open front of the main section. The bulb 13 is fitted in a socket 13a attached to main section 14, so that the bulb can be attached and detached together with the socket to and from the main section from behind. The inside surface of the main section 14 is coated with a heat-resistant protector 15 above the bulb 13. A shade 17 is attached to the peripheral edges of the open front of the main section 14 by screws 50 and an adhesive, as shown in FIG. 6. The main section 14 has notches 70 at peripheral edges of the open front, as shown in FIG. 5, for heat transfer out of the main section. The front lens 20 is fastened to the shade 17 by ultrasonic fuse-bonding and covers the open front. The outside surface of the lens 20 is slightly inclined from a vertical plane so that the bottom of the outside surface is located in front of the top thereof. The main section 14 is provided with a plurality of coupling arms 14a to which the body 18 of the cover 16 is coupled by rivets 52, as shown in FIGS. 5 and 6. The shade 17 and the cover body 18 are provided with a projection 17a and a recess 18a in appropriate positions, respectively, along the width of the cover (in a direction perpendicular to the surface of FIG. 5), which are snap fitted with each other as shown in FIG. 7, so that the shade and the cover body are coupled together. The body cover 16 comprises the shade 17 attached to the peripheral edges of the open front of the main section 14 of the stoplight body 12, and the cover body 18 surrounding the whole of the main section. The portion of the body cover 16, which is visible from outside, is processed to have small projections and recesses.

The shade 17 extends along the peripheral edges of the front lens 20. The front of the shade 17, which faces the rear window 1 of the vehicle, has the same inclination as the rear window. The shade 17 is located near the rear window so that light emitted from the bulb 13 and reflected by the rear window toward the front of the motor vehicle is blocked by the extended upper portion 17a of the shade. To be more concise, the shade 17 is located and shaped so that light emitted from the bulb 13, transmitted from the bottom point (foremost point) $P_1$ of the front lens 20 and past the foremost point $P_2$ of the upper portion 17a of the shade in the vertical central longitudinal section of the stoplight 10 and reflected by the rear window 1 as shown by $L_1$ in FIG. 5 is blocked by the top of the upper portion of the shade from proceeding to the front of the vehicle. All of the light emitted from the bulb 13 and reflected by the rear window 1 is thus blocked by the upper portion 17a of the shade 17. In other words, the shade 17 is shaped and located so that the rays $L_1$ of the light L emitted from the bulb 13, transmitted upward from the front lens 20 and reflected by the rear window 1 at the largest angle of incidence thereto are blocked by the top of the upper portion 17a of the shade. Since the angle of reflection of other light from the rear window 1 is smaller than $\Theta$ and the light L is blocked by the top of the upper portion 17a of the shade 17, all of the light emitted from the bulb 13 and reflected by the rear window 1 toward the front of the vehicle will be blocked by the upper portion of the shade. The light emitted from the bulb 13 and reflected by the rear window 1 above the bulb is thus prevented from proceeding to the rearview mirror 60 and entering into the eyes of the driver.

Figure 2:
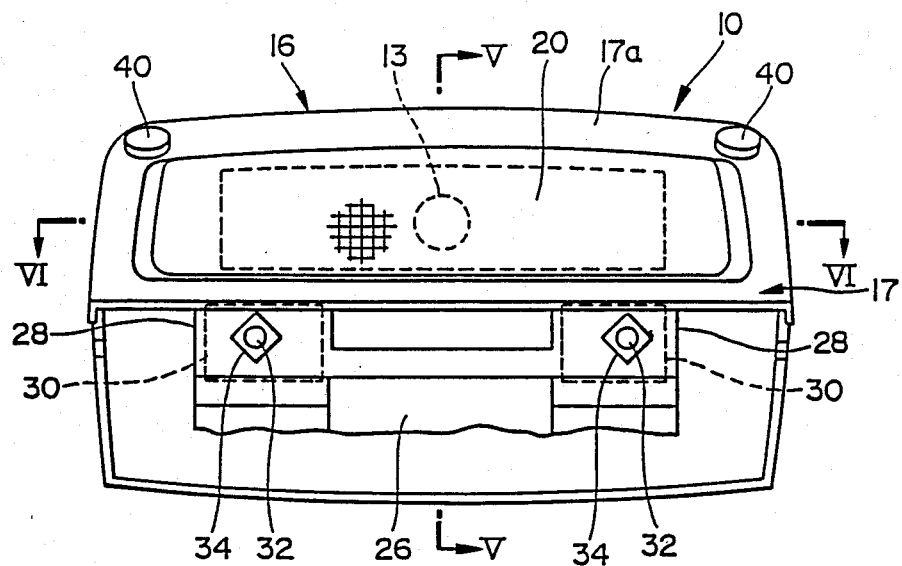
FIG. 2 is a front view of a high-mounted stoplight in accordance with a first embodiment of the invention.
Figure 3:
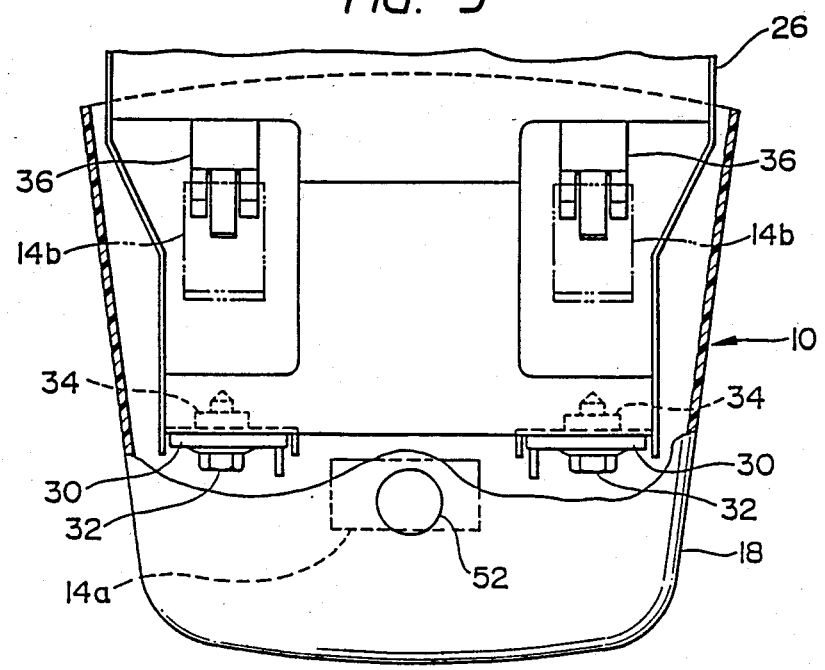
FIG. 3 is a cutaway bottom view of the stoplight.
Figure 4:
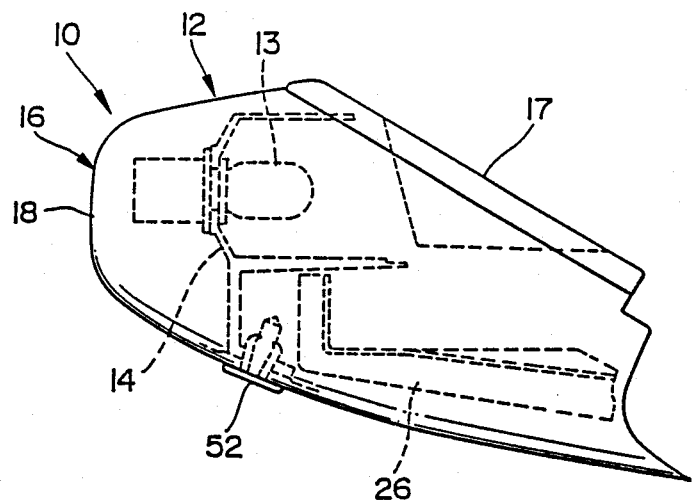
FIG. 4 is a left side view of the stoplight.
Figure 8:
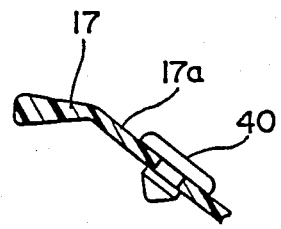
FIG. 8 is another enlarged partial sectional view of the shade.

The upper portion 17a of the shade 17 may be fitted with small circular rubber pads 40 at both ends to regulate the mounted position of the stoplight 10, as shown in FIGS. 2 and 8.

Figure 9:
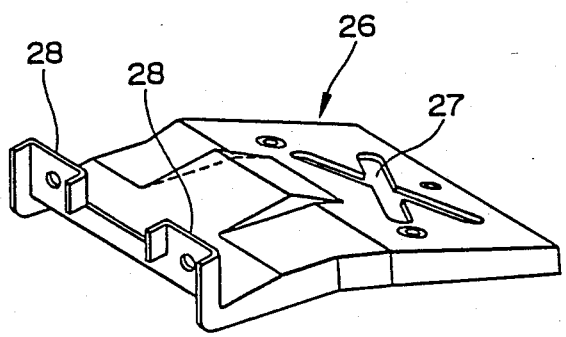
FIG. 9 is a perspective view of a bracket of the stoplight.

The main section 14 of the body 12 is secured to a bracket 26 attached to the rear structure 24 of the motor vehicle by bolts 54 and nuts 55, as shown in FIG. 5. The bracket 26 is constituted as a frame slightly bendable to be elongated, as shown in FIG. 9. The portion of the bracket 26, which is secured to the rear structure 24 of the vehicle, has reinforcing slots extending cruciformly and has a pair of body support portions 28 at one end of the bracket. The bottom of the main section 14 of the stoplight body 12 is formed with a pair of lugs 30 clamped to the body support portions 28 of the bracket 26 by bolts 32 and nuts 34. A hook 36 is welded to the bottom of the bracket 26. A lug 14b provided on the inside surface of the cover body is engaged in the hook 36.

Also shown in the drawings are a trunk plate 38 defining the trunk space, a vinyl tube 39 protecting lead wires for the bulb 13, and the outer and inner plates 24a, 24b constituting the rear structure 24 of the vehicle.

To attach the stoplight 10 to the motor vehicle, the main section 14 of the body 12 of the stoplight, the shade 17 and the front lens 20 are assembled together in advance. The bracket 26 is then secured to the rear structure 24 of the vehicle by the bolts 54 and the nuts 55. The main part 14 assembled with the shade 17 and the front lens 20 is attached to the body support portions 28 of the bracket 26 by the bolts 32. The body 18 of the cover 16 is then attached to the rear of the main section 14 of the stoplight body 12. At that time, the upper portion of the body 18 is pushed down obliquely, as shown by arrow A in FIG. 5, as the lug 14b remains engaged in the hook 36, so that the projection 17a of the shade is snapped into the recess 18a of the cover body. The cover body 18 is secured to the main part 14 by the rivets 52.

Figure 10:
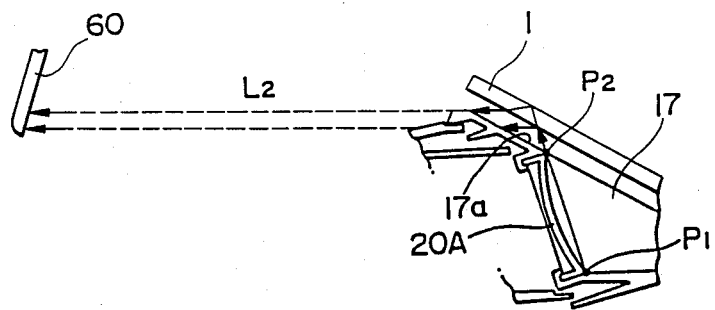
FIGS. 10, 11 and 12 are partial schematic views of stoplights according to further embodiments of the invention.

FIG. 10 shows another embodiment, wherein the stoplight has a concave lens 20A. The shade 17 of the stoplight is located and shaped so that light $L_2$ emitted from the bulb of the stoplight, transmitted from the bottom or foremost point $P_1$ of the lens, and past point $P_2$ of the upper portion and reflected by the rear window 1 of the vehicle toward the front is blocked by the top of the extended upper portion 17a of the shade.

Figure 11:
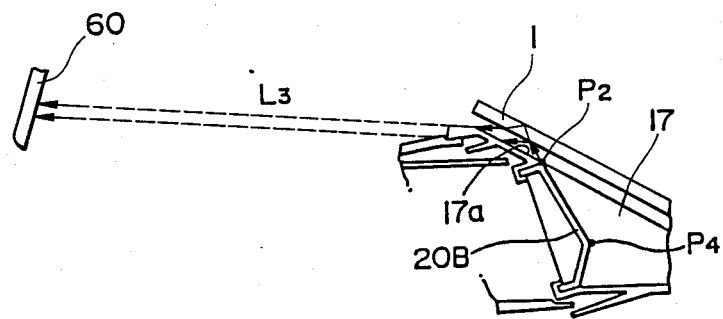

FIG. 11 shows another embodiment wherein the stoplight has a convex, bent or angled front lens 20B. The upper portion 17a of the shade is again shaped and extended so that $L_3$ emitted from the bulb, transmitted between points $P_4$ and $P_2$ and reflected by the rear window of the vehicle is blocked.

Figure 12:
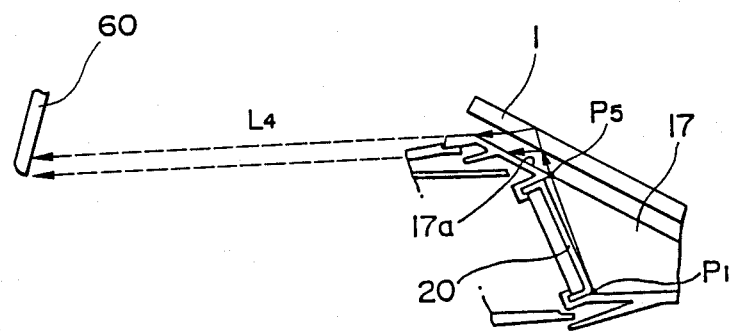
Figure 13:
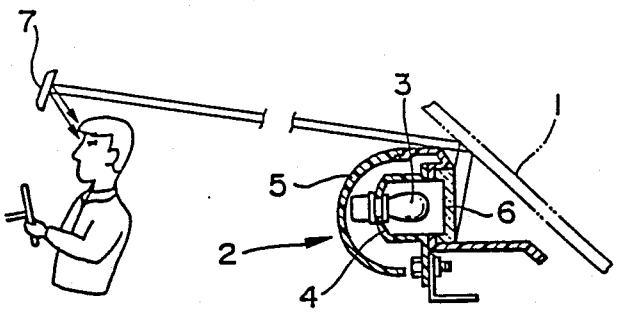
FIGS. 13 and 14 are sectional views of conventional high-mounted stoplights.
Figure 14:
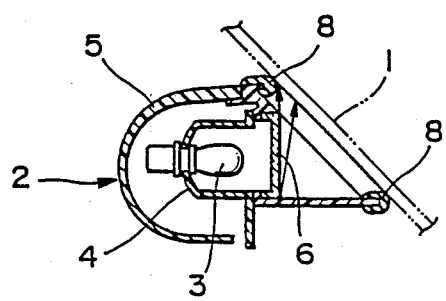

FIG. 12 shows another embodiment wherein the lens 20 is flat as in the first embodiment, but is angled back slightly such that point $P_5$ at the bottom of the upper portion 17a of the shade projects outwardly beyond the top of the lens. Again, the extended upper portion of the shade blocks the light $L_4$ that would otherwise be reflected by the rear window toward the view mirror 60.

The present invention is not confined to the above-described embodiments, but may be embodied or practiced in other various ways without departing from the spirit or essential character thereof. For example, the invention may be embodied as a high-mounted stoplight in which a body cover is not provided and a front lens is directly attached to the main section of the body of the stoplight so that light emitted from the bulb and reflected by the rear window is blocked by the upper portion of the main section of the stoplight body.

What is claimed:

1. A high-mounted stoplight (10) for a motor vehicle, comprising: a lens (20) attached to an open front of a body (12) of said stoplight, a light source (13) provided in said body behind the lens; said lens and said open front of the body being located at the center of the width of said vehicle inside a rear window thereof and spaced from said window, and a shade (17) surrounding the lens, said shade having a top edge portion (17a) extending upwardly and inwardly in a direction substantially parallel to the rear window a sufficient distance to block light (L) emitted from said light source, transmitted from a foremost lower point ($P_1$; $P_4$) of said lens, past a foremost upper point ($P_2$; $P_5$) of the shade on a vertical central longitudinal section of said stoplight, and reflected by said window toward the front of said vehicle, thus preventing such light from reaching a driver's eyes via a rearview mirror.

2. A stoplight according to claim 1, wherein said light transmitted from a foremost lower point of said lens past a foremost upper point of the shade is diffused and/or dispersed by the lens, and is transmitted in a direction substantially parallel to said lens.

* * * * *